United States Patent
Lutz

[15] 3,679,338
[45] July 25, 1972

[54] APPARATUS FOR FORMING FILLED FOOD PRODUCTS

[72] Inventor: Roger J. Lutz, Fremont, Mich.
[73] Assignee: Gerber Products Company, Fremont, Mich.
[22] Filed: June 11, 1970
[21] Appl. No.: 45,451

[52] U.S. Cl..............................425/131, 425/191, 425/381, 99/450.7
[51] Int. Cl.........................................A21c 11/16
[58] Field of Search.................107/1 D, 14 R, 14 A, 14 B, 107/14 C, 14 CA, 14 D, 14 DA, 14 F; 279/67, 110, 112; 17/35–40; 18/12 R, 12 DM, 13 R, 13 A, 13 D, 13 T, 14 R, 14 RR, 14 T, 20 R, 30 NP; 25/8, 11–16, 17 R, 18–20; 31/8, 13, 14; 72/253–261

[56] References Cited
UNITED STATES PATENTS 3,227,103  1/1966  Schafer....................107/1 D
3,233,910  2/1966  Pfaff........................279/112
3,248,122  4/1966  Roddy......................279/11 D
1,605,394  11/1926  De Angelis..............107/14 DA

*Primary Examiner*—Jordan Franklin
*Assistant Examiner*—Geo. V. Larkin
*Attorney*—Townsend and Townsend

[57] ABSTRACT

Apparatus for handling two different materials forming a filled food product, such as ready-to-eat product having an outer tubular layer of a first cereal material which encloses a core of a second non-cereal material for use as a filler for the tubular layer. A first die directs the first material into a confining chamber and a second material into the region within the first material. A second die provides for extrusion of the first material with the second material therewithin. Means is provided to adjustably mount the second die so that dies of different configurations and sizes can be used.

2 Claims, 4 Drawing Figures

INVENTOR.
ROGER J. LUTZ
BY
Townsend and Townsend
ATTORNEYS

INVENTOR.
ROGER J. LUTZ

BY
Townsend and Townsend
ATTORNEYS

APPARATUS FOR FORMING FILLED FOOD PRODUCTS

This invention relates to improvements in the making of food products by machine and, more particularly, to apparatus for forming a filled food product by an extrusion process.

The present invention is especially adapted for forming a filled food product prepared from cereal and non-cereal doughs where the cereal portion of such a product is prepared by extrusion and subsequently formed into a tube by second extrusion while being combined with the non-cereal portion in a manner such that the latter becomes a filler for the tubular cereal portion.

Filled food products made from a cereal dough and other such materials are becoming more popular as ready-to-eat items and it is desirable that such products be made by machine and that the number of operations on the different materials which are used to form the same be minimized if possible to reduce production times and costs. For instance, such a product can be formed from a thick, aqueous cereal flow suspension and a non-cereal filler by cooking the cereal suspension before it is united with the filler to form the product. Heretofore, the filling has been generally introduced into the partially cooked, expanded cereal suspension in a separate operation, after the suspension has been formed as a tube. However, when the product is prepared in this manner the heat sensitive filler, which contains animal fat, vegetable oil or some other edible low melting ingredient, penetrates or diffuses into the outer cereal suspension during subsequent cooking and detracts from the appearance and texture of the product. This affects the marketability of the product.

The present invention is directed to an apparatus which overcomes the problems inherent with the formation of a product using conventional techniques by providing apparatus for simultaneously forming the outer tube of the cereal suspension and an inner core or filler of non-cereal material. When formed with the apparatus of this invention, the product is such that its filler remains intact, i.e., it does not permeate or penetrate the outer tubular cereal material. The resulting product has a pleasing, marketable appearance and texture to thereby improve over the conventional techniques described above.

The apparatus of this invention is composed of a first die of improved construction which allows the cereal material be be directed into a chamber in which it combines with and surrounds the non-cereal filler material, the latter also passing into and through the first die so that it can be simultaneously directed into the first material as the two materials are extruded. A second die is adjustably mounted by improved bearing means across the paths of travel of the materials so as to form the product when the two materials are extruded simultaneously through the second die. The apparatus also allows for interchangeability of second dies so that the product can have different outer configurations and can be of different sizes.

The primary object of this invention is, therefore, to provide improved apparatus for forming a filled food product by extruding two different materials in a manner such that one material is formed into a tube and the second material is formed as a core for the tube with the extrusion being carried out so that the second material remains intact within the first material and does not permeate the same, thereby resulting in a food product having an attractive, marketable appearance.

Another object of this invention is to provide apparatus of the type described when a pair of dies are mounted on opposite sides of a chamber which receives the materials after passage of the same through one of the dies with the other die being adjustably mounted in the paths of the materials after the latter have been directed into the chamber whereby the second die can be adjusted with such material paths and can be replaced by another second die of different configuration and size to thereby permit variations in the configuration of the food product formed by the apparatus.

Other objects of this invention will become apparent as the following specification progresses, reference being had to the accompanying drawing for an illustration of an embodiment of the apparatus.

Figure 1:
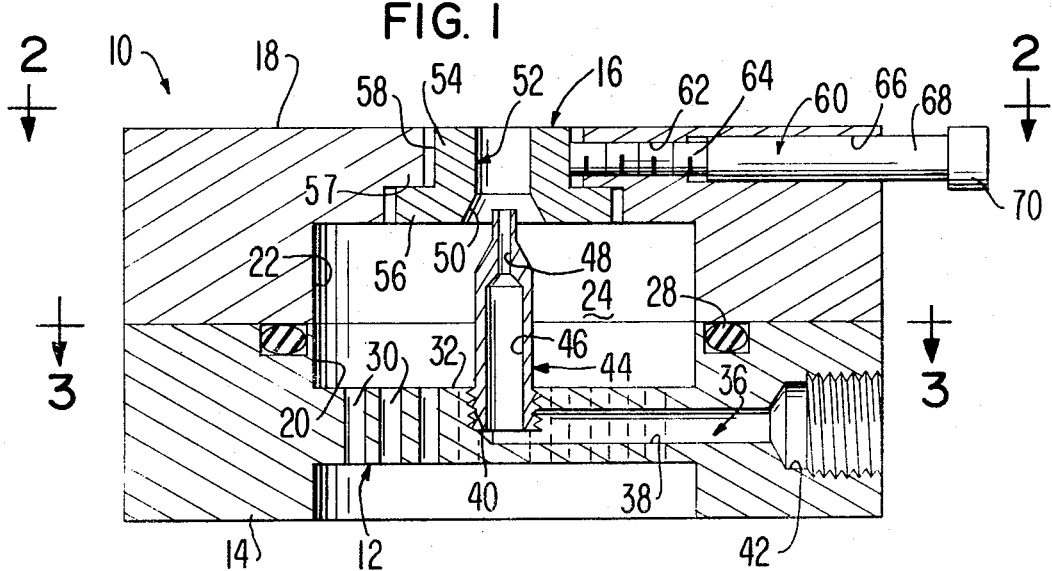
FIG. 1 is a cross-sectional view of the apparatus in this invention.

The apparatus of this invention is broadly denoted by the numeral 10 and is illustrated in cross section in FIG. 1. Apparatus 10 includes a first die 12 integral with a first support 14 and a second die 16 releasably coupled to a second support 18. Support 18 has an opening therethrough into which die 16 is removably positioned. Supports 14 and 18 have a ring-like configuration and are provided with recesses 20 and 22, respectively. These recesses mate with each other when the supports are interconnected and in abutment with each other as shown in FIG. 1 to present an enclosed chamber 24 between dies 12 and 16. Any suitable means may be provided to interconnect supports 14 and 18, such as screw fasteners extending through aligned openings 26 in the supports. An o-ring seal 28 is disposed between the abutting faces of supports 14 and 18 to seal chamber 24 at the junction of the supports.

Figure 3:
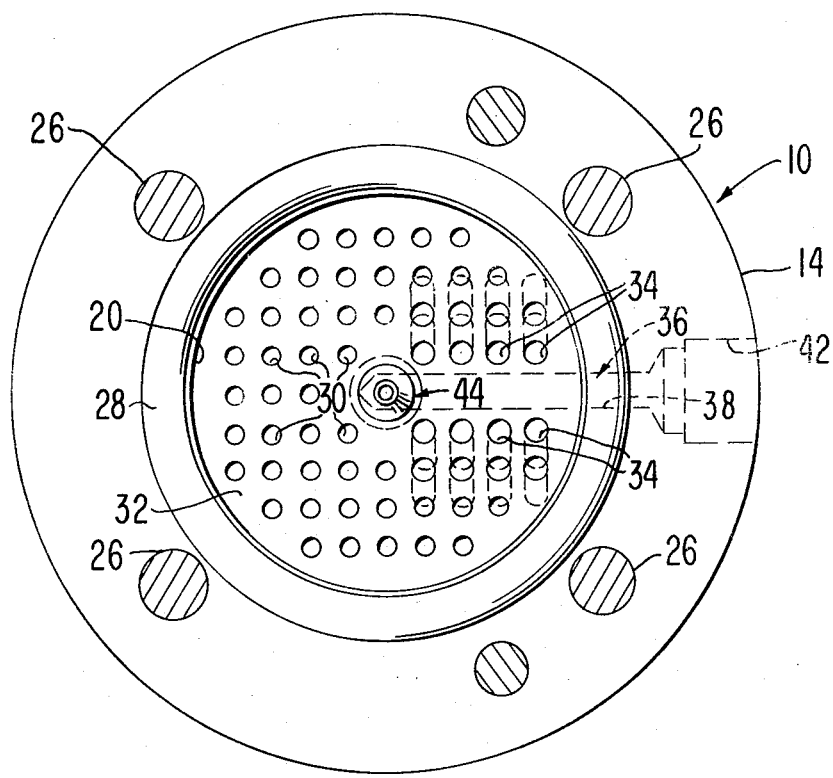
FIG. 3 is a sectional view of the apparatus looking in the direction of line 3—3 of FIG. 1.

Die 12 is provided with a plurality of first holes or passages 30 therethrough which are substantially perpendicular to the inner face 32 of die 12. The die is also provided with a plurality of second, inclined passages or holes 34 therethrough, passages 34 being to one side of passages 30 as shown in FIG. 3. Also, one group of passages 34 are disposed on one side of a passage 36 extending laterally into die 12 from support 14 and a second group of passages 34 are disposed on the opposite side of passage 36, the two groups of passages 34 being mutually convergent as the inner face 32 of die 12 is approached.

Passage 36 has a pair of mutually perpendicular sections 38 and 40, section 38 opening into an enlarged bore 42 which is internally threaded to receive a suitable connector or conduit. Section 40 is internally threaded to receive one end of a nozzle 44, the latter having a relatively large diameter bore 46 therethrough in communication with a relatively small diameter bore 48. Nozzle 44 is threadably coupled to die 12 within section 40 and extends into chamber 24, the exit end of the nozzle extending partially into the tapered section 50 of the central passage or opening 52 through die 16.

Figure 2:
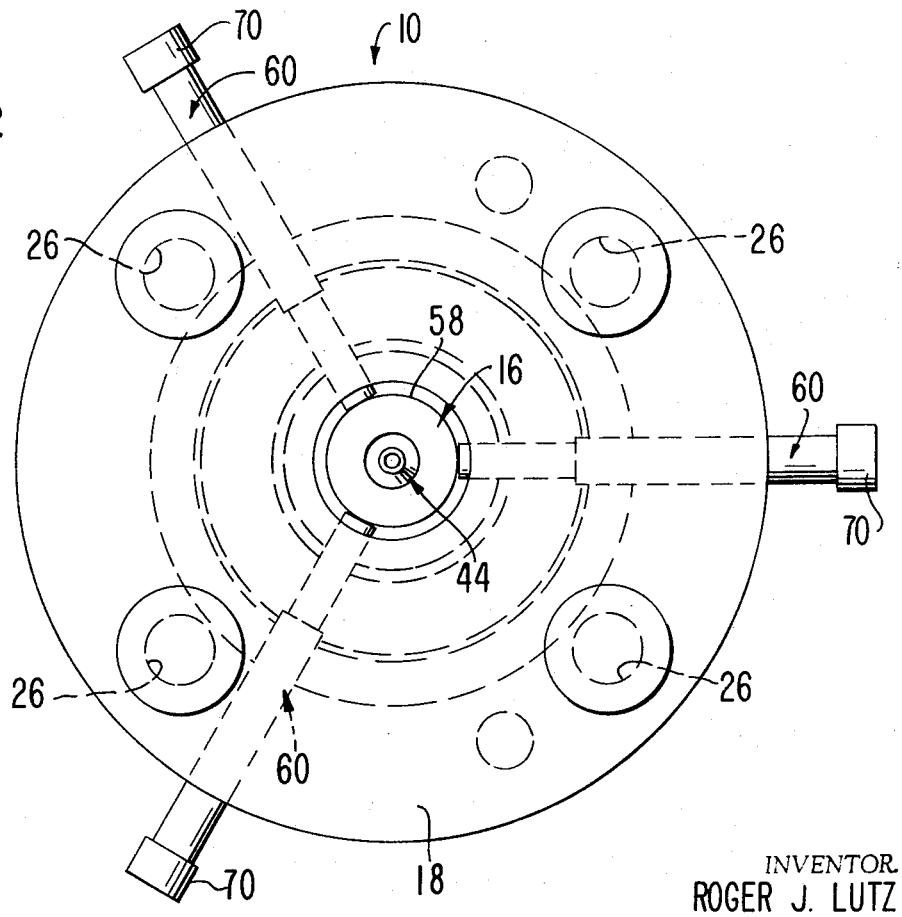
FIG. 2 is an front view of the apparatus looking in the direction of line 2—2 of FIG. 1.

Die 16 includes first cylindrical portion 52 and a second annular, flange portion 56 integral with first portion 54. Passage 52 extends axially through portions 54 and 56, portion 54 having an outer peripheral surface 58 against which a number of bearing members 60 engage and portion 56 engaging a shoulder 57 on support 8. For purposes of illustration, there are three bearing members 60 as shown in FIG. 2, each bearing member comprising an unthreaded segment 68 and a screw segment 64, threadably coupled to support 18 in the manner shown in FIG. 1. To this end, support 18 is provided with an internally threaded bore 62 for each bearing member, respectively, each bore 62 receiving the threaded segment 64 of the corresponding bearing member. A second bore 66, larger than bore 62, shiftably receives the cylindrical, unthreaded segment 68 of the bearing member. A head 70 is provided on the outer end of each bearing member, respectively.

The inner ends of the three bearing members engage surface 58 of die 16 at spaced locations thereon as shown in FIG. 2. Thus, the bearing members can adjustably position die 16 with its central opening 52 in a desired alignment with the exit end of nozzle 44.

Figure 4:
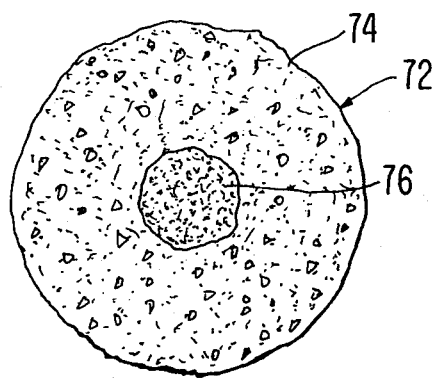
FIG. 4 is a cross-sectional view of a food product capable of being formed with the apparatus.

While apparatus 10 can be used for forming a number of different products, it is especially suitable for use in forming a filled food product wherein a first material is directed through passages 30 and 34 into chamber 24 and out of the same through opening 52 of die 16. Simultaneously with the movement of the first material, a second material is directed through passage 36 and nozzle 44 and into the first material. To form a filled food product, a cereal dough formed from oat, rice, barley, wheat, corn, soy and the like is passed from a first source connected to support 14 into and through passages 30 and 34. A second source, a source of non-cereal dough filler such as cheese, peanut butter, and the like, is connected to bore 42 so that the second material can be passed through passage 36 and nozzle 44 into opening 52. Thus, the second material will be received within the first material and the materials will be simultaneously forced through die 16 with the first material forming a tube or casing around the second material with the latter presenting a core for the first material. The resulting food product 72, shown in cross section in FIG. 4 has an outer, tubular cereal casing 74 and non-cereal inner core 76.

The food product can be of any suitable length. To this end, the food product, as it is being extruded through die 16, can be pinched off at the ends by suitable structure (not shown) to keep the core within the outer casing and to allow for further processing, such as heating or cooling.

The mounting for die 16 allows the latter to be quickly and easily adjusted with respect to nozzle 44. Moreover, the die can be quickly removed from support 18 and replaced by another die when supports 14 and 18 are separated. It is only necessary to loosen bearing members 60 to allow removal of die 16 from coupled relationship with support 18. Thereupon, a second die can be moved into place and secured to support 18 by forcing the ends of the bearing members against the surface of the new die which is then aligned with the screws.

The use of passage 36 in die 12 allows the second material to be simultaneously directed into the first material to form the food product when the materials exit from the apparatus. Passage 36 also allows the second material to pass through die 12 notwithstanding the movement of the first material through holes 30 and 34. Also, the inclination of the two groups of holes 34 assures that there will be a maximum of transfer of the first material through die 12 without any substantial interference with such transfer by passage 36.

Apparatus 10 can be quickly disassembled for cleaning if desired. Since nozzle 44 is threadably coupled to die 12, the nozzle can be separated from the die and cleaned. Also, die 16 can be readily removed from support 18 for cleaning.

What is claimed is:

1. Apparatus for extruding two dissimilar materials to form a food product comprising: a pair of support members, having a recess therebetween for defining a material-receiving chamber when the members are interconnected; means coupled with the members for releasably interconnecting the same; a first die having a plurality of holes therethrough and secured to a first of said members, the second of said members having an opening therethrough, said first die having a passage therethrough, said passage having a first section disposed transversely of said plurality of holes and a second section disposed longitudinally of said plurality of holes; nozzle means coupled with the first die in communication with said second section of the passage for directing the second material to a region adjacent to one boundary of the chamber; a second die having a central hole therethrough and provided with an outer surface; and a number of angularly disposed adjusting screws threadably coupled to the second member and movable into and out of the opening in said second member, said screws being engageable with said second die to align said second die within said opening.

2. Apparatus in accordance with claim 1 and further characterized by a pair of additional groups of holes in said first die, the first of said additional groups of holes being disposed on the opposite side of said first section, the holes of said first group being relatively convergent with the holes of said second group as the exit ends of the holes are approached.

* * * * *